Patented Jan. 3, 1928.

1,654,820

UNITED STATES PATENT OFFICE.

HENRY T. KOENIG, OF DENVER, COLORADO.

PROCESS OF ROASTING VANADIFEROUS ORES AND COMPOUNDS.

No Drawing.   Application filed October 13, 1925.   Serial No. 62,244.

This invention relates to a process of treating ores for the recovery of their valuable constituents. The process is particularly adapted for the treatment of vanadiferous ores and compounds and it consists, briefly, in roasting the ores with common salt (sodium chloride) and an acid.

The acid reacting with the sodium chloride generates hydrochloric acid which reacts on the vanadates with the result of forming free vanadic acid.

Sulfuric acid is well adapted for the purpose, and it may be administered to the ore either in its commercial form or in the form of acid sulphates or niter cake. The process as above described results in obtaining high recoveries, and in the treatment of refractory complex vanadium compounds, the process is of particular value since it renders the materials more receptive to treatment and produces satisfactory recoveries where other methods failed.

While temperatures and concentrations vary with the nature and grade of the ores or compounds under treatment, I have obtained the best results by the addition of sodium chloride in quantities varying from one per cent to twenty per cent of the ore, and sulphuric acid in quantities of from one-tenth of one per cent to ten per cent of the ore, either prior to roasting or during the period of roasting, and by carrying on the reaction at a temperature varying between six hundred and nine hundred degrees centigrade.

I am aware that in the practice of treating vanadiferous ores and compounds, roasting with sodium chloride alone is frequently resorted to for the purpose of converting vanadic acid to sodium vanadate and liberating chlorine. This process is, however, of value only where vanadium is present in the form of vanadic acid or where the vanadium is readily converted to vanadic acid, and it is unsatisfactory in the treatment of complex vanadium compounds which require breaking up to liberate vanadium so that it may be readily converted to sodium vanadate.

The addition of sulfuric acid not only increases the recovery in the treatment of most vanadiferous ores by roasting in the presence of sodium chloride, but causes the formation of free vanadic acid in refractory complex ores which could not be obtained by the use of sodium chloride only.

What I claim and desire to secure by Letters Patent is:

1. The process of treating vanadiferous ores and compounds consisting in roasting the material with sodium chloride and an acid.

2. The process of treating vanadiferous ores and compounds consisting in roasting the material with sodium chloride and sulfuric acid.

3. The process of treating vanadiferous ores and compounds consisting in roasting the material with from one per cent to twenty per cent of sodium chloride and from one-tenth of one per cent to ten per cent of sulphuric acid.

4. The process of treating vanadiferous ores and compounds consisting in roasting the material to a temperature of from six hundred degrees to nine hundred degrees centigrade with from one per cent to twenty per cent of sodium chloride and from one-tenth of one per cent to ten per cent of sulphuric acid.

In testimony whereof I have affixed my signature.

HENRY T. KOENIG.